L. LÖWENSTEIN.
PROCESS OF MAKING HYDROGEN PEROXID FROM IMPURE PERSULFURIC ACID SOLUTIONS.
APPLICATION FILED NOV. 15, 1910.
1,013,791.
Patented Jan. 2, 1912.
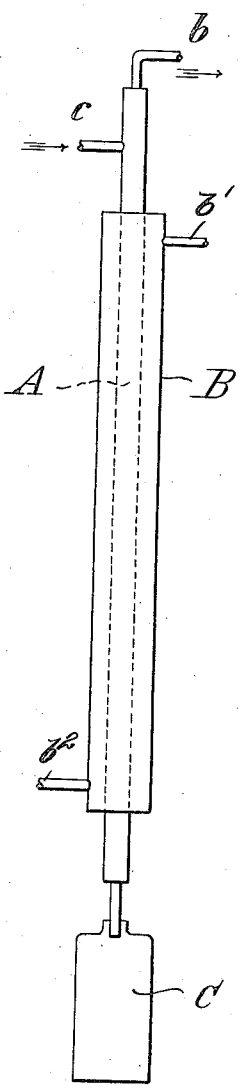
Witnesses:
Inventor
Leo Löwenstein
by
Atty

UNITED STATES PATENT OFFICE.

LEO LÖWENSTEIN, OF VIENNA, AUSTRIA-HUNGARY.

PROCESS OF MAKING HYDROGEN PEROXID FROM IMPURE PERSULFURIC-ACID SOLUTIONS.

1,013,791.          Specification of Letters Patent.          Patented Jan. 2, 1912.

Application filed November 15, 1910. Serial No. 592,534.

*To all whom it may concern:*

Be it known that I, LEO LÖWENSTEIN, subject of the Emperor of Germany, residing at Vienna, Austria-Hungary, have invented certain new and useful Improvements in Processes of and Apparatus for the Production of Peroxid of Hydrogen from Impure Solutions of Persulfuric Acid, of which the following is a specification.

It has been heretofore considered impracticable to manufacture commercially pure peroxid of hydrogen by distilling impure solutions of persulfuric acid and particularly solutions contaminated with salts of heavy metals. It has been supposed that a high purity of the persulfuric acid was essential, otherwise, the commercial manufacture of peroxid of hydrogen would be extremely difficult. Applicant, however, has discovered that pure peroxid of hydrogen can be manufactured commercially even though the persulfuric acid may be impure, a novel mode of distillation being used for the purpose. The purpose of this distillation is to separate the evaporable part of the solution from the mother liquor. An increasing concentration of the catalyzing agents constantly takes place in the mother liquid and these catalyzing agents have a very noxious effect. According to the ordinary mode of distillation, there is a continuous inflow of persulfuric acid and a continuous discharge of sulfuric acid. If peroxid of hydrogen contaminated with catalyzing agents is submitted to distillation, the solution to be distilled and which is already concentrated to a high degree would have to flow into a solution enriched with catalyzing agents and would also have to remain in the hot liquid for a considerable length of time, that is to say, until all peroxid of hydrogen has been extracted. Furthermore, the boiling point of the concentrated solution is relatively high. Experiments have shown that the rate of decomposition of the solution increases more rapidly than the concentration. While attempts have been made to obtain an increase in the yield of peroxid of hydrogen from impure solutions by continuously withdrawing the peroxid of hydrogen as it is generated, from persulfuric acid, no method or apparatus has been proposed whereby the peroxid of hydrogen would be removed immediately and continuously.

The process provided by the present invention insures a very rapid evaporation of the most unstable peroxid of hydrogen, in a vacuum, and results in an increased yield of the product. Also, according to the present process, the liquor flowing through the apparatus in concentrated progressively and in different bodies which are separated from one another so that the products that are concentrated to the relatively higher degrees cannot flow back to those which are concentrated to relatively lower degrees. In this way, the process affords facilities for utilizing to the greatest extent the advantages derived from the working of a liquor of a relatively low degree of concentration. Such conditions could in a measure be met by an intermittent distillation from an ordinary flask for, in that case, the successive products of different degrees of concentration would be separated from one another. An intermittent distillation, however, would be impracticable where great quantitites must be handled and, moreover, it would be difficult to maintain the liquor at a sufficiently high temperature to produce rapid evaporation for the reason that the ratio between the heating surface and the quantity of liquor is too small. For this and other reasons, the process just described would be inappropriate for the commercial distillation of solutions containing catalytic agents.

To overcome the difficulties presented and to provide a commercially practicable process, it is essential to maintain a proper separation of the products. Moreover, a gradient of concentration must be established between the persulfuric acid as it enters the apparatus and the sulfuric acid discharging therefrom, and such gradient should consist of numerous steps. Such a process can be carried out commercially without serious difficulties. For example, a substantial yield of peroxid of hydrogen can be obtained by providing a sufficient number of horizontal tubes, such tubes to be heated by a steam jacket, the solution being permitted to flow successively through the tubes. The tubes in such a case would contain the solution at different degrees of concentration. The apparatus just described, however, presents certain mechanical difficulties in operation and I have found that a much better yield can be obtained with an apparatus which is also free of mechanical objections, such apparatus embodying vertical or inclined tubes inclosed in a suitable steam jacket, the persulfuric acid to be distilled being admitted at the top and flowing in a very thin layer over the entire surface afforded by the interior wall of the tube. In this way, a gradient of concentration is obtained which ranges from the top to the bottom of the tube, such gradient involving an almost infinite number of steps or degrees of concentration. Furthermore, in such an apparatus, the ratio between the heating surface and the quantity of liquid to be heated is most effective and, consequently, the rate of evaporation is very high.

In the accompanying drawing, I have shown as an example, such an apparatus which I find to be the most appropriate for the commercial distillation of peroxid of hydrogen, such apparatus fulfilling the conditions presented.

In the construction shown, A represents a tube surrounded by a steam jacket B, a receiver C for sulfuric acid being connected to the bottom of the tube A. Steam is admitted to and discharged from the jacket through the pipe connections $b'$ and $b^2$. The persulfuric acid to be distilled is admitted to the tube A through the pipe $c$, and the peroxid of hydrogen is distilled off and discharged through the pipe $b$ which conducts the vapor to a suitable condensing vessel. The distillation may be conducted at a temperature of about 100° C. If, however, a vacuum is used, the temperature may be reduced accordingly.

It will be understood that while I have discussed the production of peroxid of hydrogen from persulfuric acid, my discussion is also applicable to the products of transformation of persulfuric acid and particularly to the so called Caro's acid which is usually contained in small quantities in the persufuric acid and which quantities, in the course of distillation, are temporarily increased.

I claim as my invention:—

The hereindescribed process of obtaining peroxid of hydrogen from persulfuric acid or its products of transformation which comprises submitting the persulfuric acid to distillation while flowing in a thin film of large area which is heated to effect rapid evaporation.

In testimony whereof I have hereunto set my hand in presence of two subscribing witnesses.

LEO LÖWENSTEIN.

Witnesses:
   JOSEF RUBANK,
   ADA MARIA BERGER.